United States Patent
Wilson

(10) Patent No.: US 11,540,490 B2
(45) Date of Patent: Jan. 3, 2023

(54) MODULAR PET RECREATIONAL ASSEMBLY

(71) Applicant: Catastrophic Creations LLC, Byron Center, MI (US)

(72) Inventor: Michael Wilson, Byron Center, MI (US)

(73) Assignee: Catastrophic Creations, LLC, Byron Center, MI (US)

(*) Notice: Subject to any disclaimer, the term of this patent is extended or adjusted under 35 U.S.C. 154(b) by 735 days.

(21) Appl. No.: 16/283,812

(22) Filed: Feb. 24, 2019

(65) Prior Publication Data
US 2020/0267934 A1    Aug. 27, 2020

(51) Int. Cl.
*A01K 15/00*    (2006.01)
*A01K 15/02*    (2006.01)
*A01K 1/035*    (2006.01)

(52) U.S. Cl.
CPC ............ *A01K 15/025* (2013.01); *A01K 1/035* (2013.01)

(58) Field of Classification Search
CPC ............................. A01K 15/025; A01K 15/035
USPC .................................. 119/702, 707, 416, 452
See application file for complete search history.

(56) References Cited

U.S. PATENT DOCUMENTS

| | | | |
|---|---|---|---|
| 2,748,854 A | 6/1956 | Lynch | |
| 4,347,807 A | 9/1982 | Reich | |
| 4,576,116 A * | 3/1986 | Binkert | A01K 1/033 119/498 |
| D338,283 S | 8/1993 | Pfriender | |
| 5,320,065 A * | 6/1994 | Leopold | A01K 1/035 229/120.32 |
| 5,577,465 A * | 11/1996 | Cook | A01K 15/027 119/28.5 |
| 5,806,464 A | 9/1998 | Willinger et al. | |
| D563,604 S | 3/2008 | Pacana et al. | |
| 7,337,748 B1 | 3/2008 | Morris | |
| D604,016 S | 11/2009 | Langston | |
| D611,204 S | 3/2010 | Slater | |
| 8,776,727 B1 | 7/2014 | Nelligan | |
| 9,326,433 B2 | 5/2016 | Hall | |
| D789,622 S | 6/2017 | Kellogg | |
| 10,123,512 B2 | 11/2018 | Ting | |
| 2010/0154719 A1 * | 6/2010 | Kellogg | A01K 15/025 119/702 |
| 2013/0036986 A1 * | 2/2013 | Callari | A01K 1/035 493/344 |

(Continued)

FOREIGN PATENT DOCUMENTS

CN    201821737 U    5/2011

*Primary Examiner* — Richard T Price, Jr.
(74) *Attorney, Agent, or Firm* — Caldwell Intellectual Property Law

(57) ABSTRACT

A modular pet recreational assembly includes at least a frame, which may include a first frame having a first vertical wall and a second vertical wall opposite the first vertical wall. Multifunctional support dowels may connect first vertical wall to second vertical wall. One or more shelves may protrude beyond first vertical wall and second vertical wall. A sheet of flexible material may be incorporated, with a first end secured to the at least a frame and a second end secured to the at least a frame. The sheet of flexible material, shelf, and/or first or second vertical wall may have one or more openings sized to permit passage of a small animal such as a cat.

20 Claims, 5 Drawing Sheets

(56) References Cited

U.S. PATENT DOCUMENTS

2015/0351367 A1 12/2015 Lin
2017/0339916 A1 11/2017 Deraps
2020/0267934 A1* 8/2020 Wilson ................. A01K 15/025

* cited by examiner

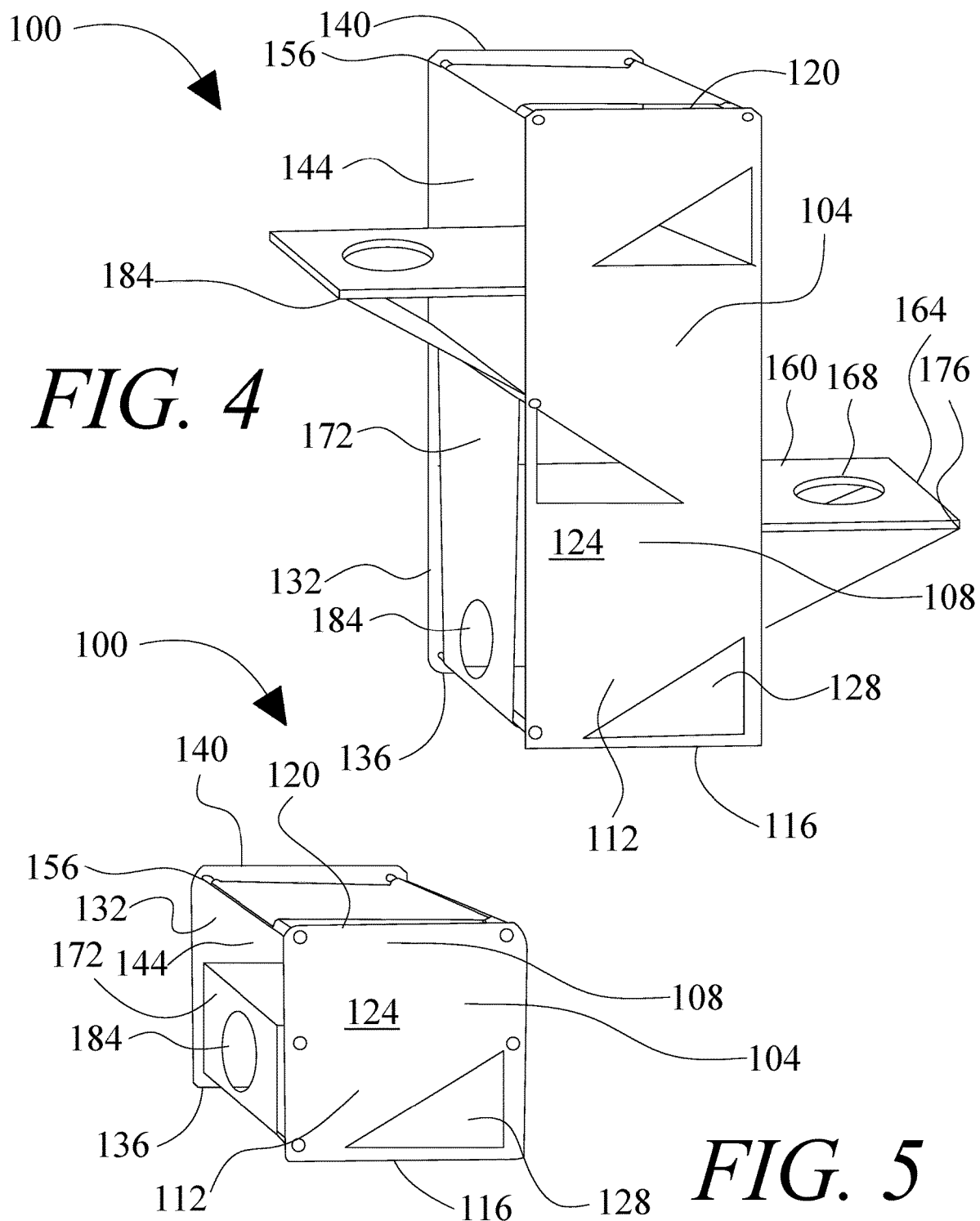

MODULAR PET RECREATIONAL ASSEMBLY

FIELD OF THE INVENTION

The present invention generally relates to the field of furniture for pets. In particular, the present invention is directed to a modular pet recreational assembly

BACKGROUND

Domesticated animals such as cats and dogs frequently enjoy play time as part of their day to day routine, for which a number of pet furniture has been developed. However, most pet furniture lacks the ability to hold an animal's attention for long durations of time, due to lack of structures to play and, hide, and climb within. Further, pet furniture can be bulky, often taking up large quantities of space which can be prohibitive for city dwellers living in small spaces. Pet furniture can also frequently be designed to attract smaller cats and dogs but fail to support cats and dogs which can sometimes weigh upwards of 30 pounds. This can all result in messes, boredom, and failure of cats and dogs to be occupied and entertained for long stretches of time.

SUMMARY OF THE DISCLOSURE

In one aspect, a modular pet recreational assembly is disclosed. The modular pet assembly includes at least a frame. The at least a frame includes a first frame. The first frame includes a first vertical wall, the first vertical wall including a first lower end, a first upper end, a first outer surface and a first inner surface. The first frame includes a second vertical wall located opposite to the first vertical wall, the second vertical wall including a second lower end, a second upper end, a second outer surface, and a second inner surface facing the first inner surface, wherein the first lower end and the second lower end combine to form a first base, the first upper end and the second upper end combine to form a first top. The first frame includes at least a multi-functional support dowel that connects the first vertical wall and the second vertical wall. The first frame includes at least a shelf attached to the first vertical wall and the second vertical wall. The assembly includes a sheet of flexible material having a first end attached to a first location on the at least a frame and a second end attached to a second location the at least a frame.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 4 is a perspective view of an exemplary embodiment of a modular pet recreational assembly; and FIG. 5 is a perspective view of an exemplary embodiment of a modular pet recreational assembly.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed towards a modular pet recreational assembly. Assembly includes at least a frame, which may include at least a first frame and a second frame. Each frame of at least a frame may include two vertical side walls connected by at least a multifunctional support dowel. Each frame of at least a frame may include a shelf, which may protrude beyond the two vertical side walls. A sheet of flexible material includes two ends attached to the at least a frame, and may be detached and reattached at different points, including at a distal end of a shelf or at one or more support dowels. Sheet of flexible material may be stretched around one or more support dowels, permitting the sheet of flexible material to be configured as a ramp, wall, floor, or other element within the at least a frame; the sheet may be attached to a first frame at a first end and a second frame at a second end. Frames may be stackable; for instance, a first frame may be stackable on first top of a second frame. A reconfigurable flexible sheet and stackable frames may enable a user to modify the assembly as desired to provide different features for a pet to explore. Any of a shelf, a wall, and/or a sheet of flexible material may include a through-hole through which a pet may be able to pass.

Figure 1:
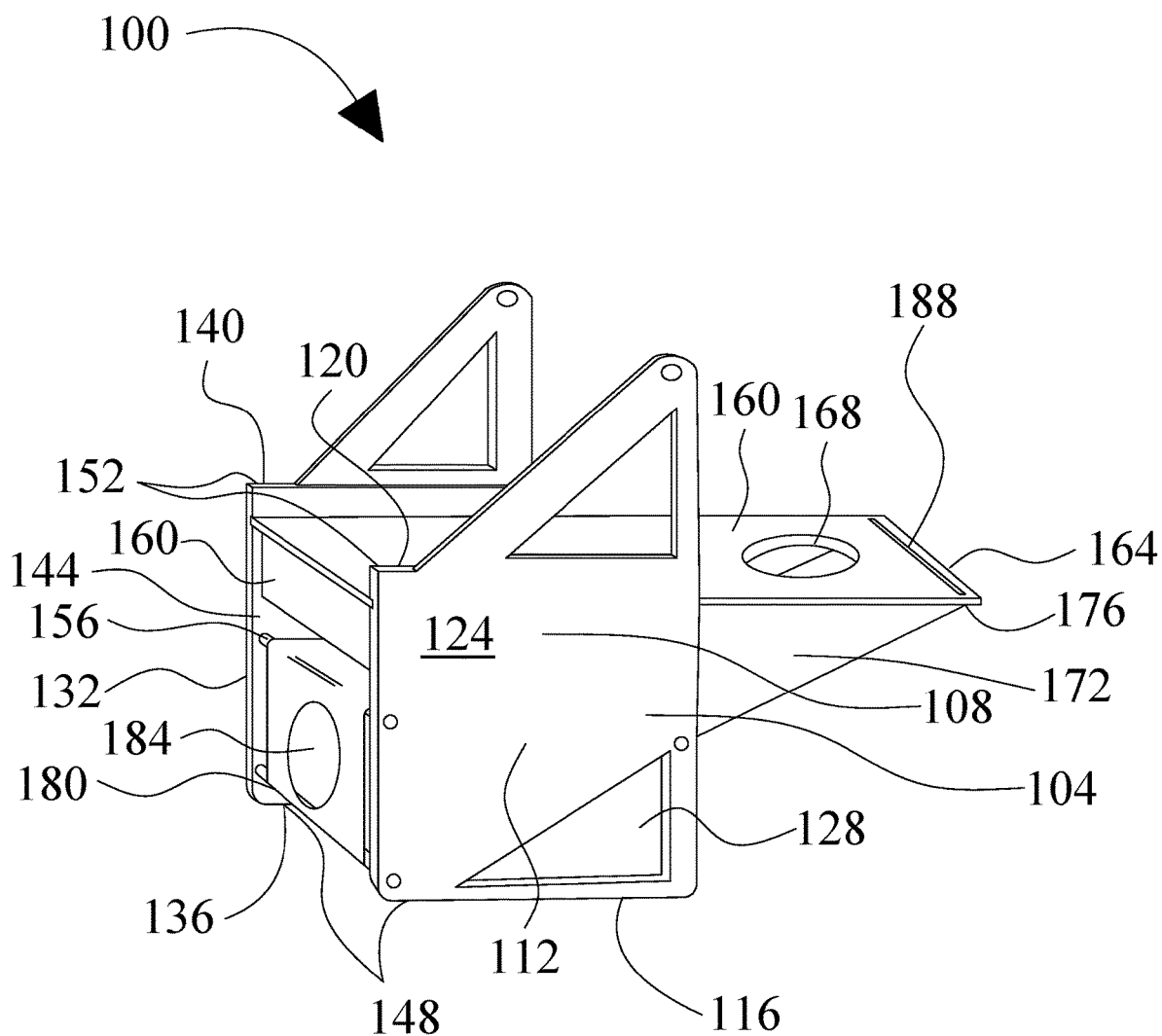
FIG. 1 is a perspective view of an exemplary embodiment of a modular pet recreational assembly.

Referring now to FIG. 1, an exemplary embodiment of a modular pet recreational assembly 100 is illustrated. Assembly 100 includes at least a frame 104; at least a frame 104 may act to support weight of assembly 100 and/or an animal climbing in or on or otherwise using assembly 100; at least a frame 104 may be sufficiently strong to support an animal weighing up to 30 pounds. At least a frame 104 includes a first frame 108. First frame 108 includes a first vertical wall 112. First vertical wall 112 may be constructed of any suitable material or combination of materials; in an embodiment, the material composition of first vertical wall 112 selected so that first frame 108 has sufficient support to sustain a weight of 30 pounds as described and illustrated below. First vertical wall 112 may be composed of any suitable material or combination of materials. Materials making up first vertical wall 112 may include, without limitation, plant materials such as wood or bamboo, metal, polymer materials such as plastic, composite materials such as fiberglass, ceramics, glass, or any combination thereof; materials may include materials that are flexible or elastomeric. First vertical wall 112 includes a first lower end 116 and a first upper end 120; first lower end 116 may be situated vertically beneath first upper end 120 when first frame 108 is in use. First vertical wall 112 may include a front edge and a back edge. First vertical wall 112 includes a first outer surface 124 and a first inner surface; first inner surface may have any form or appearance suitable for use as a second inner surface 144 as described in further detail below. First inner surface may be identical and/or a mirror image of a second inner surface 144 as described in further detail below. First vertical wall 112 may have any suitable shape; for instance, and without limitation, first vertical wall 112 may be planar and/or flat. First vertical wall 112 may have any regular or irregular polygonal or curved perimeter form. For example, and without limitation, first vertical wall 112 may have substantially straight front and or rear edges, which may be perpendicular to a surface on which first lower end 116 rests. First lower end 116 may include a substantially straight edge, one or more feet, or any other suitable form; in an embodiment, first lower end 116 may be configured to permit first frame 108 to rest on a supporting surface such as a floor, table, the ground, or the like in a stable manner, so as to remain upright when being climbed upon by an animal such as a cat.

Continuing to refer to FIG. 1, first vertical wall 112 may contain a side opening 128. Side opening 128 may be of any suitable shape; for instance, and without limitation through-opening having a triangular or approximately triangular shape. In an embodiment, a triangular opening may include an angle that includes a right angle. In an embodiment, triangular opening may have the form of an equilateral triangle. In an embodiment, triangular opening may have the form of an isosceles triangle whereby two sides may be equal in length. In an embodiment, triangular opening may be a scalene triangle whereby all three sides may be different lengths. Side opening 128 may be located at any suitable location along first vertical wall 112. In an embodiment, side opening 128 may be located at lower end of first vertical wall 112. Opening such as a triangular opening may be upwards pointing, wherein at least an angle of triangular opening pointing toward first upper end 120. In an embodiment, side opening 128 may be located at upper end of first side vertical structural wall. In an embodiment, side opening 128 may be located in middle of first vertical wall 112 equidistant from lower end of first vertical wall 112 and upper end of first vertical wall 112. Side opening 128 may be placed along outer edge of first side. In an embodiment, there may be a plurality of side openings 128 in first vertical wall 112. There may be more than one side opening 128 in first vertical wall. In an embodiment, side opening permits an animal using assembly 100 with a way to enter assembly through first vertical wall 112; side opening 128 may further function as a window for animals to peer through when inside or outside assembly 100 and may aid users in accessing and/or viewing interior of assembly 100.

Still referring to FIG. 1, first frame 108 may include a second vertical wall 132 located opposite to the first vertical wall 112, where "opposite" indicates that first vertical wall 112 and second vertical wall 132 form two side walls of first frame 108; first vertical wall 112 and second vertical wall 132 may be approximately parallel to each other, for instance and/or form two opposite sides of a substantially rectilinear three-dimensional structure. Second vertical wall 132 may be constructed from any material or combination of materials suitable for construction of first vertical wall 112. Second vertical wall 132 may have any shape suitable for use as a shape of first vertical wall 112; second vertical wall 132 may, without limitation, be identical to first vertical wall 112, or may be a mirror image of first vertical wall 112. Second vertical wall 132 includes a second lower end 136, a second upper end 140, a second outer surface, which may have any form and/or appearance suitable for first outer surface 124, and a second inner surface 144, each of which may be as described above for first lower end 116, first upper end 120, first outer surface 124, and first inner surface as described above. Second inner surface 144 may be facing first inner surface; for instance, and without limitation, first inner surface and second inner surface 144 may face one another across an interior space within first frame 108. First lower end 116 and the second lower end 136 combine to form a first base 148; first base 148 may rest on a surface beneath first frame 108. First base 148 may be sufficiently stable to prevent first frame 108 from tipping or falling over; for instance, first lower end 116 and second lower end 136 may each be substantially flat and horizontal, to form a rectangular array when in parallel to one another. First vertical wall 112 and second vertical wall 132 may be secured to each other to form a rigid structure using dowels and/or shelves as described in further detail below. Base may alternatively or additionally be configured to aid in stacking first frame 108 on top of additional frames, for instance and without limitation as described in further detail below regarding FIGS. 2A-B. First upper end 120 and second upper end 140 combine to form a first top 152; top may have any suitable shape, including a shape permitting stacking of additional frames on top of first frame 108.

Continuing to view FIG. 1, second vertical wall 132 may include a side opening. Side opening may be a through-opening. Side opening may have any shape suitable for use as side opening of first vertical wall 112. Side opening may be positioned in any way suitable for positioning of a side opening 128 on first vertical wall 112. In an embodiment, side-opening may be positioned opposite side opening 128 of first vertical wall 112; side opening may match side opening 128 of first vertical wall, for instance by having the same or approximately the same shape, being lined up with side opening 128 or the like.

Still viewing FIG. 1, first frame 108 includes at least a multi-functional support dowel 156 that connects the first vertical wall 112 and the second vertical wall 132. At least a multi-functional support dowel 156 may be composed of any material or combination of materials suitable for construction or composition of first vertical wall 112, including without limitation, plant materials such as wood or bamboo, metal, polymer materials such as plastic, composite materials such as fiberglass, ceramics, glass, or any combination thereof; materials may include materials that are flexible or elastomeric. At least a multi-functional support dowel 156 may have a cylindrical or approximately cylindrical shape Cylindrical shape may include a cylindrical rod, which may have a solid or hollow construction. At least a multi-functional support dowel 156 may have any suitable alternative shape; for instance, at least a multi-functional support dowel 156 may have an elongate shape and have a substantially polygonal, rectangular, and/or curved cross-sectional form, and/or a cross-sectional form combining any regular or irregular polygonal and/or or curved elements.

Continuing to refer to FIG. 1, at least a multi-functional support dowel 156 may be securely fastened to each of first vertical wall 112 and second vertical wall 132; for instance, and without limitation, each dowel of at least a multi-functional support dowel 156 may have a first end attached to first vertical wall 112 and a second end attached to second vertical wall 132. Fastening may be accomplished by any suitable means, including without limitation using a fastener, such as a threaded fastener. A threaded fastener may include, as a non-limiting example, a screw, nut, and/or bolt. Screws may be composed of materials which may include wood, sheet metal, plastic, stainless steel, brass, nickel, and/or aluminum. Screws may contain tapered shank or non-tapered shank and may include for example, double ended dowel screws, drive screws, drywall screw, eye screw, lag bolt, mirror screw, sheet metal screw, twin fast screw, wood screw, and/or a security head screw. Nuts and bolts may also be used to attach the at least a multi-functional support dowel 156 at different points on first vertical wall 112 and/or second vertical wall 132. Nuts may include fasteners that contain a threaded hole and bolts may include threaded fasteners that may contain an external male thread. Nuts may be used together in conjunction with a mating bolt to fasten items together. Nuts may utilize various locking mechanisms such as lock washers, jam nuts, lockwire, castellated nuts, and/or nylon inserts. Nuts may be of a certain size and shape, such as a hexagonal shape. Nuts may be composed of materials which may include steel, stainless steel, bronze, metal, wood plastic, brass, nickel, aluminum, and/or nylon. Nuts may include for example, acorn nut, barrel nut, cage nut, coupling nut, cross dowel nut, flange nut, insert nut, knurled nut, split nut, sleeve nut, square nut, swage nut, T-nut, T-slot nut, weld nut, well nut, wing nut, and/or locknuts. Bolts may include heads that can engage with a tool to tighten them. Heads may be of a specific design and shape to fit with certain tools, such as for example a hexagonal shape that can engage with tools such as a wrench or screw driver. Nuts and bolts may be composed of materials which may include steel, stainless steel, bronze, metal, wood, plastic, brass, nickel, aluminum and/or nylon. Bolts may include for example, anchor bolts, arbor bolts, carriage bolts, elevator bolts, hanger bolts, hex bolts, J bolts, lag bolts, rock bolts, sex bolts, shoulder bolts, and/or U-bolts. At least a multi-functional support dowel 156 may be detachable and reattachable from first vertical wall 112 and/or second vertical wall 132, for instance by unfastening and refastening fasteners or the like. A dowel of at least a multi-functional support dowel 156 may be a fastener, such as a rod with threading at one or both ends, or the like.

With continued reference to FIG. 1, first frame 108 may include at least a shelf 160 attached to the first vertical wall 112 and the second vertical wall 132. At least a shelf 160 may be composed of any materials suitable for the composition of first vertical wall 112, including, without limitation, plant materials such as wood or bamboo, metal, polymer materials such as plastic, composite materials such as fiberglass, ceramics, glass, or any combination thereof; materials may include materials that are flexible or elastomeric. At least a shelf may have any suitable shape including rectilinear, polygonal, or other shapes; for instance, at least a shelf may have two parallel or approximately parallel sides that contact first inner surface and second inner surface. At least a shelf 160 may include any structural element on which an animal such as a cat may balance or support itself; for example, at least a shelf may include, without limitation, a planar surface on which a cat may recline, a ridge or edge on which a cat may balance, or any other shape conducive to support and/or entertainment of a cat resting its weight thereon. At least a shelf 160 may include an object oriented in any suitable way, including vertical and/or horizontal orientations. For instance, at least a shelf may include, without limitation a flat or planar surface such as a board or the like which is substantially horizontal, forming for instance a floor, loft, or platform on which a cat may recline, a flat or planar surface such as a board or the like which is substantially vertical, forming for instance a wall or partial wall on top of which a cat may perch, an angled flat surface forming a ramp or similar structure a cat may recline on, climb up, or slide down, or any other shape conducive to the purposes described above. Sides of at least a shelf 160 may fit into grooves in first inner surface and second inner surface; for instance, and without limitation, where at least a shelf includes a flat horizontally oriented object, grooves may include horizontal grooves in first inner surface and second inner surface, while if at least a shelf includes a vertically oriented object, grooves may include vertical grooves in first inner surface and second inner surface, and if at least a shelf includes a slanted flat object, grooves may include slanted grooves in first inner surface and second inner surface. Where grooves or similar elements are used, a shelf of at least a shelf 160 may be slid into position, and either secured there using any suitable fastener and/or adhesive or may alternatively or additionally be free to slide for adjustment of position. At least a shelf 160 may include a through-hole 164. Through-hole 164 may be of a certain size and shape that may allow for the passage of a cat or small animal weighing 30 pounds. At least a shelf 160 may be of a certain shape, such as for example a square and/or or a rectangle. In an embodiment, a shelf of at least a shelf 160 may protrude and hang over and past first vertical structure wall and second vertical structure wall; for instance, the at least a shelf 160 may include a distal end 168 projecting away from first vertical wall 112 and second vertical wall 132. At least a shelf 160 is cantilevered between the first base 148 and the first top 152. The at least a shelf 160 may support the weight of an object or animal placed on it, such as for example a cat weighing 30 pounds; for instance, where at least a shelf 160 projects beyond first frame, at least a shelf 160 and first frame may be constructed so that a center of gravity of at least a shelf 160 and/or first frame is within first frame when a weight of 30 pounds is located at distal end, where "without first frame" indicates between front and rear edges of first vertical wall and second vertical wall, and or between the inner surfaces of the first vertical wall and the second vertical wall. This may be accomplished by selection of weight of first and/or second vertical wall and/or at least a shelf to set center of gravity as described above, and/or by selection of length of shelf and/or distance from distal end to first frame, so as to achieve the center of gravity described above; persons skilled in the art upon reviewing the entirety of the disclosure will be aware of various ways in which the center of gravity may be set as desired according to this disclosure. As a result, first frame 108 may remain stable with a 30-pound animal resting at distal end of at least a shelf 160. The at least a shelf 160 may include a through-hole 164. Through-hole 164 may include an opening which may allow for small animals and pets to pass through. Through-hole 164 may be of a certain size and shape. For example, through-hole 164 may be of a circular shape that may allow for the passage of a cat weighing 30 pounds.

Figure 2A:
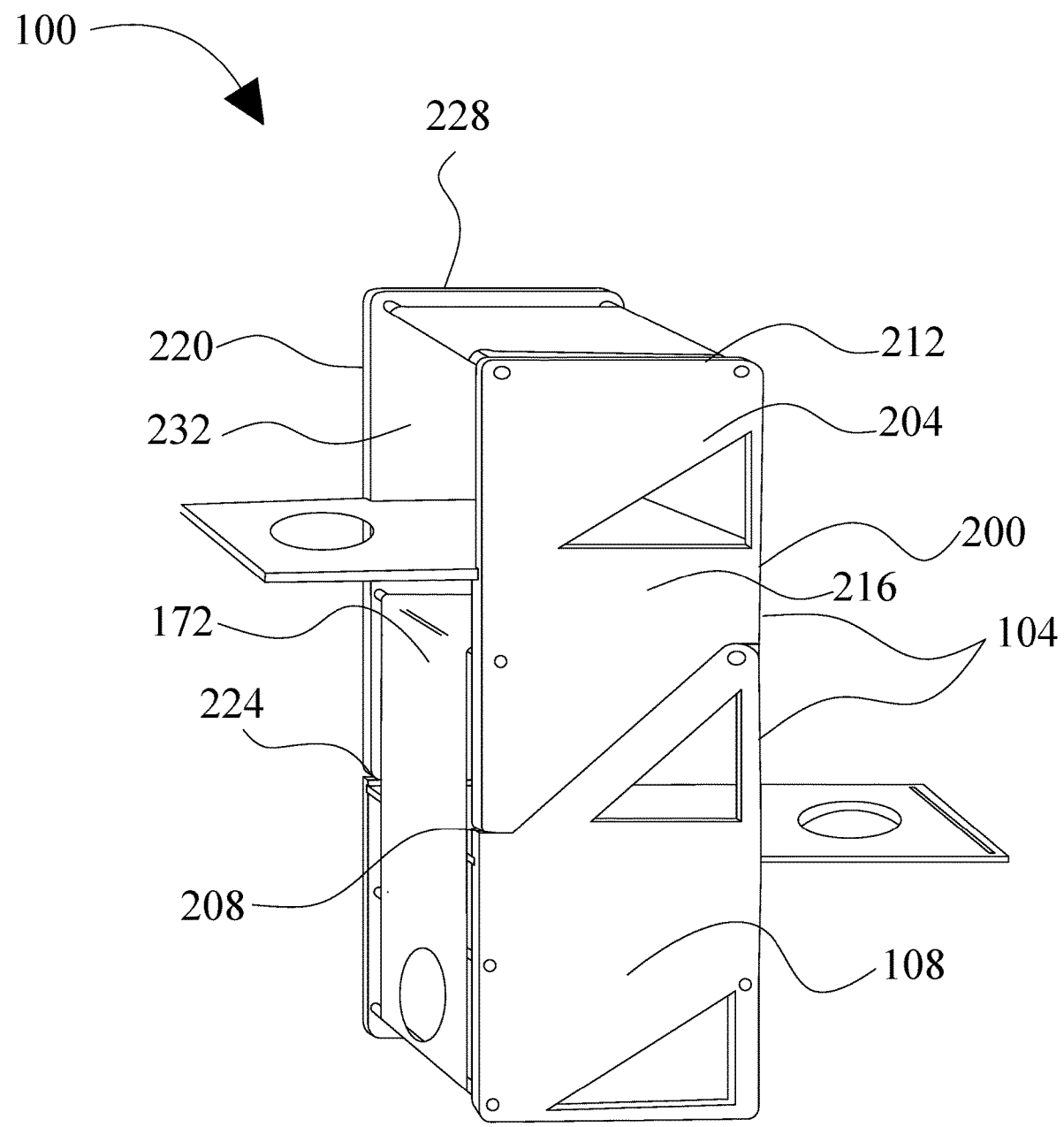
FIG. 2A is a perspective view of an exemplary embodiment of a modular pet recreational assembly having multiple frames.

Referring now to FIG. 2A, at least a frame may include a plurality of frames, which may be stacked on one another at least a frame 104 may include a second frame 200. Second frame 200 may be stacked on first top 152 of first frame 108. Second frame 200 may be composed of any material or combination of materials suitable for the composition or construction of first frame 108 or any component thereof, including without limitation first vertical wall 112. Second frame 200 may include any element suitable for inclusion in first frame 108. As a non-limiting example, second frame 200 may include a third vertical wall 204, the third vertical wall 204 including a third lower end 208, a third upper end 212, a third outer surface 216 and a third inner surface, each of which may have any form, material composition, or configuration suitable for use as first vertical wall 112, first upper end 120, first lower end 116, first outer surface 124 and/or first inner surface. Second frame 200 may include a fourth vertical wall 220 located opposite to the third vertical wall 204; the fourth vertical wall 220 may include a fourth lower end 224, a fourth upper end 228, a fourth inner surface 232 and a fourth outer surface. Each of fourth vertical wall 220, fourth lower end 224, fourth upper end 228, fourth inner surface 232 and/or fourth outer surface may have any form suitable for use as second vertical wall 132, second lower end 136, second upper end 140 second outer surface and/or second inner surface 144. Fourth inner surface 232 may face third inner surface. Second frame 200 may include at least a multifunctional support dowel 156 as described above in reference to first frame 108. Second frame 200 may include at least a shelf 160 as described above in reference to first frame 108. Third lower end 208 and fourth lower end 224 may combine to form a second base 148. Third upper end 212 and fourth upper end 228 may combine to form a second top 152.

Still referring to FIG. 2A, second frame 200 may be secured on top 152 of first frame 108 by any suitable means. In an embodiment, first top 152 may include a first mating feature, and second base 148 may include a second mating feature. First mating feature may include any component of any latching or fastening apparatus. A first mating feature may latch or fasten to second mating feature. A first mating feature may form a mortise-and-tenon combination with a corresponding second mating feature; the mortise-and-tenon combination may include at least a projection and/or recess in at least a first mating feature that is inserted into and/or penetrated by a corresponding recess and/or projection in a corresponding mating element. As a non-limiting example, at least a first mating feature may include at least a projection, which may be cylindrical or have any other suitable form. At least a projection may project from first upper end 120 and/or second upper end 140. Alternatively or additionally second base 148 may be secured to first top 152 using any suitable attachment means including, without limitation, screw or bolt-holes with screws, bolts, or nails, adhesive detachable surface fasteners such as pressure adhesive, hook-and-loop fasteners, a press fastener or the like. Where attachment means includes screw holes or the like in one of first frame 108 and second frame 200, such screw holes may line up with similar holes the other of first frame 108 and second frame 200 and allow screws or similar fasteners to pass through all such holes and secure first frame 108 to second frame 200.

Figure 2B:
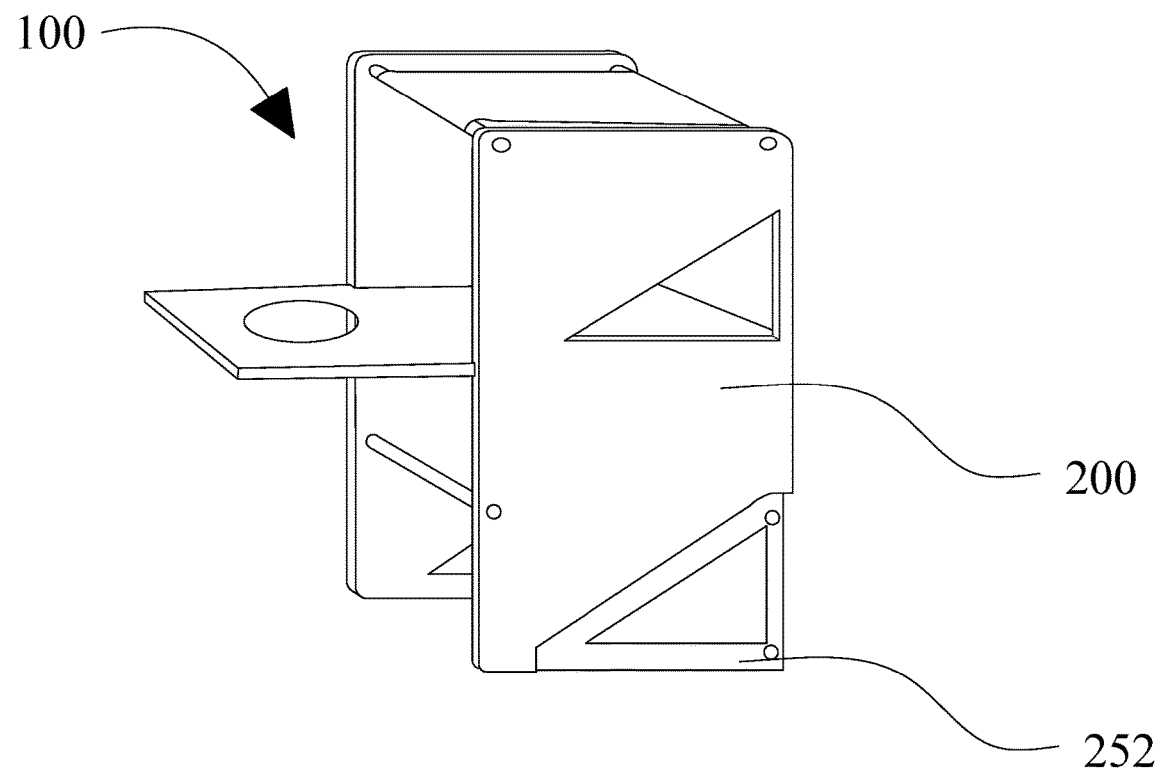
FIG. 2B is a perspective view of an exemplary embodiment of a modular pet recreational assembly having multiple frames.
Figure 2B:
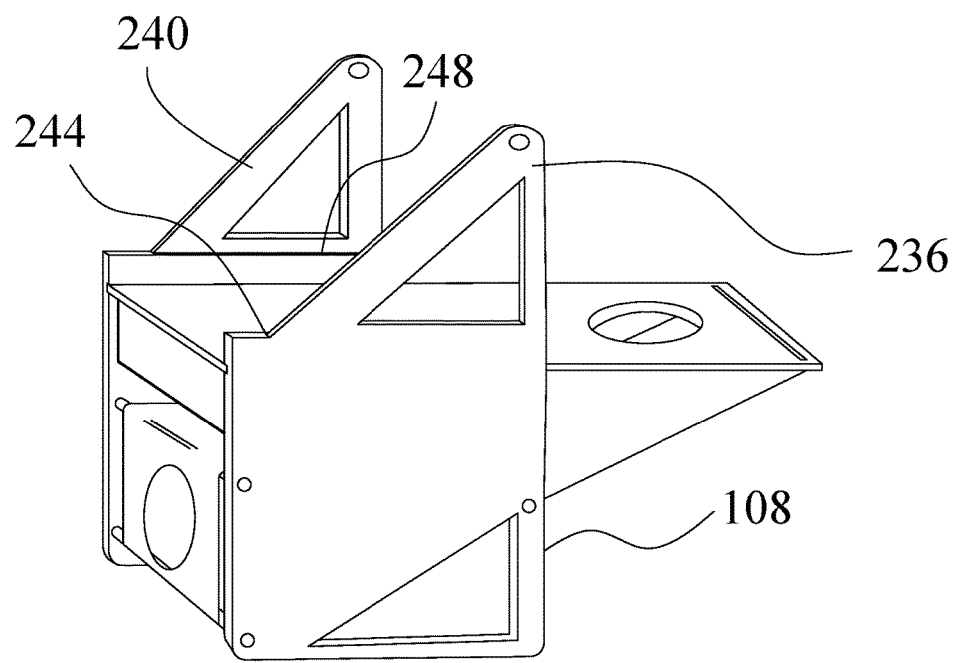

Referring now to FIG. 2B, in an exemplary embodiment, second frame 200 is secured to first frame 108 using a mating arrangement in which first upper end 120 includes a first upward-pointing projection 236. First upward-pointing projection 236 may be of any suitable shape, such as for example a triangle. Projection may be upwards pointing, wherein at least an angle of the projection may be positioned and pointing towards the first top 152 of first frame 108. Second upper end 140 may also include a second upward-pointing projection 240; second upward-pointing projection 240 may have any shape suitable for use as first upward-pointing projection 236. Each and/or either of the first upward-pointing projection 236 and the second upward-pointing projection 240 includes a slanted upper edge; a slanted upper edge may serve to catch a corresponding lower edge on second frame 200, so as to guide second frame 200 into a stable position atop 152 first frame 108. First upward-pointing projection may include a through-hole, which may be any through-hole and/or opening as described in this disclosure for any element of assembly 100.

Continuing to refer to FIG. 2B, first upper end 120 may include a first lip 244 located at the first inner surface. First lip 244 may include an approximately horizontal portion of upper end; for instance, and without limitation, first projection may have a width less than a width of upper end, such that upper end extends in a horizontally oriented lip or shelf toward second vertical wall 132; first projection may alternatively be flush with first inner surface while admitting a similar shelf on first outer surface 124. Alternatively or additionally, second lip 248 may include a projection from first inner surface or first outer surface 124. Second upper end 140 may include a second lip 248 located at the second inner surface 144. Second lip 248 may be constructed in any manner suitable for construction of first lip 244, including a shelf on second inner surface 144 extending toward first inner surface. In an embodiment, third lower end 208 of the rests on the first lip 244, and/or fourth lower end 224 rests on second lip 248, when second frame 200 is stacked on top 152 of first frame 108. First upward-pointing projection 236 may pass to the outside of third outer surface 216 while second upward-pointing projection 240 may pass to the outside of fourth outer surface; either first upward-pointing projection 236 or second upward-pointing projection 240 may alternatively or additionally pass to the inside of third inner surface and/or fourth inner surface 232.

Still referring to FIG. 2B, second frame 200 may include a recess into which first upward-pointing projection 236 and/or second upward-pointing projection 240 may fit. For instance, and without limitation, second frame 200 may include a first downward-facing recess 252 in the third vertical wall 204 and/or a second downward-facing recess in the fourth vertical wall 220. First downward-facing recess 252 may be configured to mate with the first upward-pointing projection 236 when the second frame 200 is stacked on first top 152 of the first frame 108. First downward-facing recess 252 may include at least a downward-facing surface that contacts at least a surface of first upward-pointing projection 236. First downward-facing recess 252 may have any shape suitable for admitting first upward-pointing projection 236. In an embodiment, first downward-facing recess 252 includes at least a shape matching a shape of first upward-pointing projection 236. First downward-facing recess 252 may have the same, or approximately the same, shape as first upward-pointing projection 236. Where first upward-pointing projection 236 includes a slanting surface, first down-ward facing projection may include a matching slanting surface that contacts the first slanting surface of first upward-pointing projection 236. Second downward-facing recess may be configured to mate with the second upward-pointing projection 240 when the second frame 200 is stacked on second top 152 of the second frame 200. Second downward-facing recess may include at least a downward-facing surface that contacts at least a surface of second upward-pointing projection 240. Second downward-facing recess may have any shape suitable for admitting second upward-pointing projection 240. In an embodiment, second downward-facing recess includes at least a shape matching a shape of second upward-pointing projection 240. Second downward-facing recess may have the same, or approximately the same, shape as second upward-pointing projection 240. Where second upward-pointing projection 240 includes a slanting surface, second down-ward facing projection may include a matching slanting surface that contacts the second slanting surface of second upward-pointing projection 240. Second frame may have a through hole at downward-facing recess, which may, for instance, combine with a through-hole in upward-facing projection to form an opening in assembly 100; opening and/or through-hole may function, be formed, and/or have shape of any through-hole and/or opening described at any point in this disclosure. Where downward-facing recesses and upward-facing projections mate to connect first and second frames, any additional means of fastening may be combined therewith to further secure frames together; tension of a sheet of flexible material may alternatively or additionally act to hold frames together. Any forms of attachment described at any point in this disclosure may be used and/or combined to secure any portion of any embodiment of assembly 100 to any other such portion.

Referring again FIG. 1, first frame 108 includes at least a sheet of flexible material 172. At least a sheet of flexible material 172 may be composed any suitable material or combination of materials. For instance, and without limitation, at least a sheet of flexible material 172 may be constructed of materials including textiles such as without limitation cotton, acetate, acrylic, cashmere, linen, lycra, metallic, modal, mohair, nylon, polyester, rayon, silk, soy, spandex, elastane, Tencel, viscose, and/or wool. Materials may include sheets of non-textile flexible material including leather, natural or artificial polymers, or the like. Materials may include rigid materials jointed together with hinges or strips of flexible material; rigid material may include, without limitation, any materials suitable for composition of first vertical wall 112. In an embodiment, the at least a sheet of flexible material 172 may have sufficient strength, such as tensile strength, to support the weight of an object or animal placed on it, such as for example a cat weighing 30 pounds. At least a sheet of flexible material 172 may be of a certain shape, such as for example, a square or rectangle.

Still referring to FIG. 1, sheet of flexible material 172 includes a first end 176 attached to a first location on the at least a frame 104 and a second end 180 attached to a second location the at least a frame 104. The at least a sheet of flexible material 172 may include a through-hole 184. Through-hole 184 may include an opening which may allow for small animals and pets to pass through. Through-hole 184 may be of a certain size and shape. For example, through-hold may be of a circular shape that may allow for the passage of a small animal of a size to weigh 30 pounds, such as a cat. First end 176 and/or second end 180 of sheet of flexible material 172 may be attached at any of various points on at least a frame 104. For instance, at least a shelf 160 may include a slot 188 located at distal end 168 of shelf 160, where at least a shelf includes a distal end 168. Slot 188 may include a narrow aperture that may extend for a portion of the end of the at least a shelf 160. In an embodiment, the slot 188 may be hollowed out. In an embodiment, the slot 188 may not be hollowed out but may rather form a recess that may contain a backing. Backing may include any of the materials which may make up the at least a shelf 160. Shelf 160 may slide back and forth from front edge of first and second vertical structure wall to back edge of first and second vertical structure wall. In an embodiment, the first end 176 of the at least a sheet of flexible material 172 may be attached at the slot 188 located on the at least a shelf 160; second end 180 may be attached at the at least a multi-functional support dowel 156. The at least a sheet of flexible material 172 may be attached at each end at different points on first frame 108 by any fasteners as described above, including without limitation threaded fasteners.

With continued reference to FIG. 1, in an embodiment, first end 176 of the sheet of flexible material 172 may be attached at first top 152 and second end 180 of sheet of flexible material 172 may be attached to distal end 168 shelf 160. In such an embodiment, the at least a sheet of flexible material 172 may be attached by four threaded fasteners such as screws, with one screw located at the first upper end 120, one screw located at the second upper end 140, and two screws located on distal end 168 shelf 160. In an embodiment, the at least a sheet of flexible material 172 may be attached at varying angles and from varying points on first frame 108. The at least a sheet of flexible material 172 may be stretched taught or may be given any degree of slack as desired. In an embodiment the at least a sheet of flexible material 172 may have an end 176 attached at the at least a shelf 160. At least a sheet of flexible material 172 may have an end attached to a dowel of the at least a multifunctional dowel 156; attachment may be effected by passing a sleeve on the end of at least a sheet of flexible material over the dowel, by wrapping a portion of the sheet at the end around the dowel and securing it with any fastener, including without limitation a hook and loop fastener, or the like. In an embodiment, the at least a sheet of flexible material 172 may be located at the back edge of second lower end 136, for example the at least a sheet of flexible material 172 may have a first end 176 attached at the at least a shelf 160 and the second end 180 of the at least a sheet of flexible material 172 may be attached at the backside of the first lower end and the backside of the second lower end 136. In an embodiment, the at least a sheet of flexible material 172 may be of varying shapes and sizes, depending on the location on first frame 108 as well as the angle of placement and attachment. In an embodiment, the at least a sheet of flexible material 172 may be a square and/or rectangular shape. In an embodiment, the at least a sheet of flexible material 172 may include a square shape located at the first top 152, with one corner of the square located at front side first upper end 120, one corner of the square located at front side second upper end 140, one corner of the square located at back side first upper end 120, and one corner of the square located at back side second upper end 140. In an embodiment, where first frame 108 is stacked on top 152 of second frame 200, first end 176 of at least a sheet of flexible material 172 is attached to first frame 108 and second end 180 of the at least a sheet of flexible material 172 is attached to second frame 200.

Figure 3:
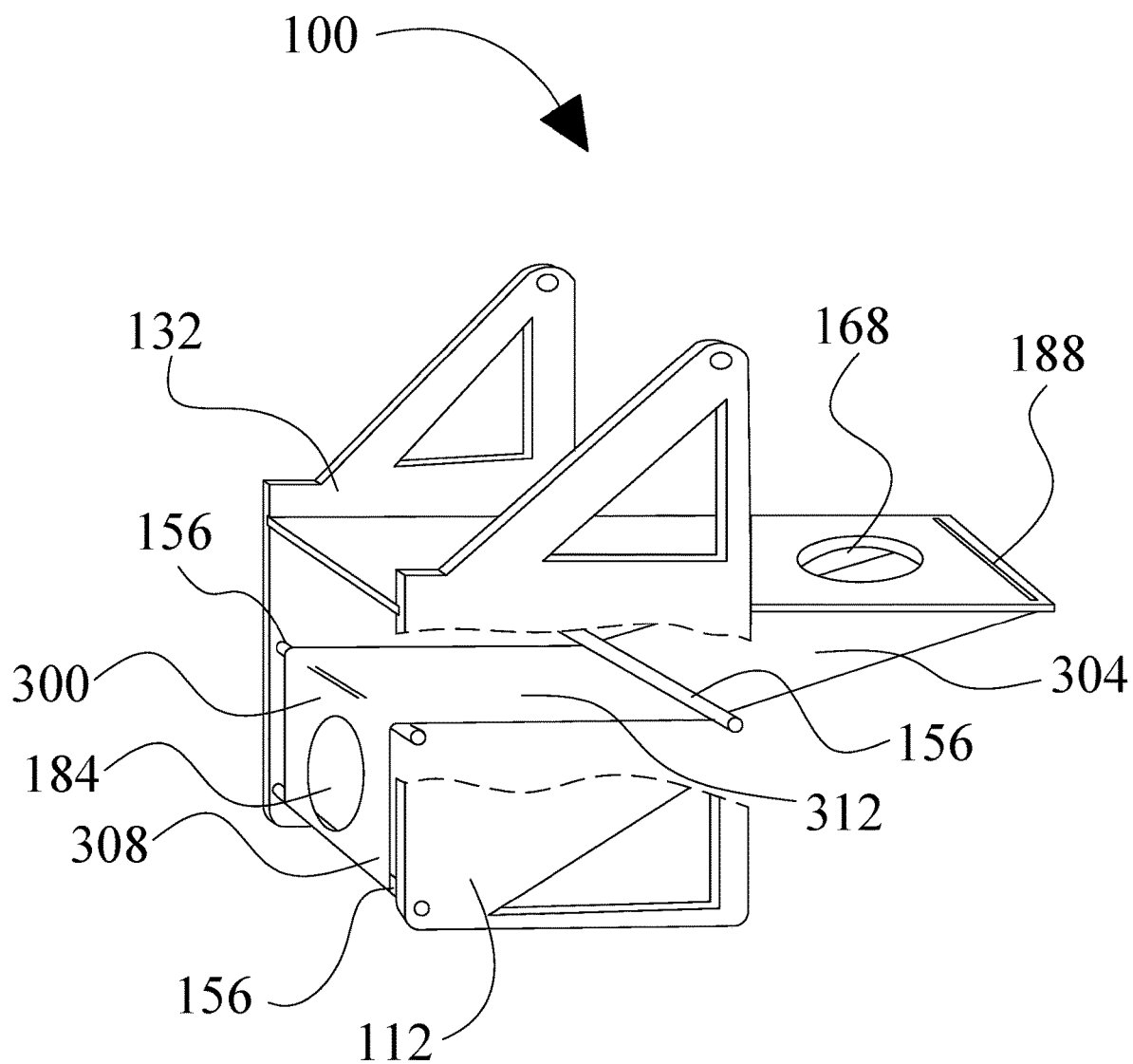
FIG. 3 is a partial cutaway view of an exemplary embodiment of a modular pet recreational assembly.

Referring now to FIG. 3, a partially cut away diagram of an embodiment at least a frame 104 illustrates some exemplary manners in which flexible sheet of material may be attached to at least a frame 104. In an embodiment, first location is a multi-functional support dowel 156 of the at least a multifunctional support dowel 156. Sheet of flexible material 172 may be stretched across and/or bent around one or more elements of first frame 108 to create varied structures having recreational value for a small animal using assembly 100. Sheet of flexible material 172 may be pulled taught around one or more elements of at least a frame 104 to form one or more such structures. As an example, sheet of flexible material 172 may include a middle portion 300, which may be any part of sheet of flexible material 172 between first end 176 and second end 180. Middle portion 300 may be stretched around one or more multifunctional support dowels 156 of the at least a multifunctional support dowel 156. So arranged, sheet of flexible material 172 may form a ramp 304 with all or part of middle portion 300; for instance, ramp 304 may be positioned beneath a through-hole 164 in a shelf 160, so that an animal may pass through the latter to climb or slide down the former or climb up the former to pass through the latter. In an embodiment, a ramp 304 may be formed by securing first end 176 of sheet of flexible material 172 to a first multifunctional support dowel 156 and/or slot 188, and second end 180 to a second multifunctional support dowel 156 and/or slot 188; alternatively or additionally middle portion 300 may be wrapped and/or stretched around first or second multifunctional support dowel 156, for instance when first and second support dowel 156 offset from one another horizontally. As a further example, sheet of flexible material 172 may form a vertical section 308 disposed between the first vertical wall 112 and the second vertical wall 132 and perpendicular to the first vertical wall 112 and the second vertical wall 132. In an embodiment, this may be accomplished by securing first end 176 of sheet of flexible material 172 to a first multifunctional support dowel 156 and/or slot 188 and second end 180 to a second multifunctional support dowel 156 and/or slot 188; alternatively or additionally middle portion 300 may be wrapped and/or stretched around first or second multifunctional support dowel 156. Through-hole 184 may be positioned in vertical section 308 of the at least a sheet of flexible material 172, for instance located near the first base 148 for use as a door or entry into assembly 100. At least a portion of sheet of flexible material 172 may be used to form a horizontal section 312 such as a floor and/or ceiling by stretching at least a portion of sheet of flexible material 172 across two horizontally arrayed multifunctional support dowels 156. Sheet of flexible material may be stretched taught to form a ramp 304, vertical section 308 and/or horizontal section 312; in some embodiments, stretching sheet of flexible material 172 taught may enable ramp 304, vertical section 308, and/or horizontal section 312 to provide resistance to flexion in a manner analogous to a rigid element, to support weight of an animal such as a cat that is using assembly 100. In an embodiment, sheet of flexible material 172 stretched taught may aid in overall stability of assembly 100 by, as a non-limiting example, urging frames of at least a frame 104 together through elastic recoil force and/or tension in sheet of flexible material 172. A user may reconfigure sheet of flexible material 172 in various ways to form structures as described above; in an embodiment, first end 176 may be detached from the at least a first location and attached to a third location on the at least a frame 104. Second end 180 may be detached from the at least a second location and attached to a fourth location on the at least a frame 104. Assembly 100 may include multiple sheets of flexible material; sheets may come in a variety of sizes, and may be used to create walls ceilings, floors, ramps, or the like by attachment to various support dowels 156 and/or slots 188.

Referring now to FIG. 4, at least a frame may include a tower frame 400. Tower frame 400 may include any element suitable for use as first frame 108; first frame 108 may be a tower frame in some embodiments. Tower frame 400 may include two protruding shelves. In an embodiment, and referring now to FIG. 5, at least a frame 104 may include a frame 500 that does not have a shelf. Any frame that may be included in at least a frame 104 may be stacked on top of or underneath any other such frame; in an embodiment, a plurality of frames are combined through stacking to create play-tower for a cat or similar animal; one or more sheets of flexible material may pass from one frame to another or be attached to a single frame, in various configurations which may occur to persons skilled in the art upon reviewing the entirety of this disclosure. An advantageous feature of assembly 100 may be an ability to rearrange assembly 100 as desired to suit space requirements, tastes of a user, and/or apparent preferences of an animal using assembly 100. In other embodiments one or more frames of at least a frame may be attached side-by-side and/or front to back; for instance, one frame may be attached at front or rear edges of another frame, to an exterior surface of first vertical wall, second vertical wall, or any like structures, or the like.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Furthermore, the foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A modular pet recreational assembly, the assembly comprising:
   at least a frame, the at least a frame including a first frame comprising:
   a first vertical wall, the first vertical wall including a first lower end, a first upper end, a first outer surface and a first inner surface;

a second vertical wall located opposite to the first vertical wall, the second vertical wall including a second lower end, a second upper end, a second outer surface, and a second inner surface facing the first inner surface, wherein the first lower end and the second lower end combine to form a base and the first upper end and the second upper end combine to form a top;

at least a multi-functional support dowel that connects the first vertical wall and the second vertical wall; and at least a shelf attached to the first vertical wall and the second vertical wall; and a sheet of flexible material having a first end attached to a first location on the at least a frame and a second end attached to a second location on the at least a frame.

2. The assembly of claim 1, wherein at least one of the first vertical wall and the second vertical wall includes a side opening.

3. The assembly of claim 1, wherein the at least a shelf further comprises a through-hole.

4. The assembly of claim 1, wherein the at least a frame further comprises a second frame stacked on top of the first frame, the second frame comprising:
a third vertical wall, the third vertical wall including a third lower end, a third upper end, a third outer surface and a third inner surface;
a fourth vertical wall located opposite to the third vertical wall, the fourth vertical wall including a fourth lower end and a fourth upper end.

5. The assembly of claim 4, wherein:
the first upper end further comprises a first upward pointing projection; and
the second upper end further comprises a second upward pointing projection.

6. The assembly of claim 5, wherein each of the first upward pointing projection and the second upward pointing projection includes a slanted upper edge.

7. The assembly of claim 5, wherein:
first upper end further comprises a first lip located at the first inner surface; and
the second upper end further comprises a second lip located at the second inner surface.

8. The assembly of claim 7, wherein:
the third lower end rests on the first lip; and
the fourth lower end rests on the second lip.

9. The assembly of claim 5, wherein the second frame further comprises:
a first downward-facing recess in the third vertical wall; and
a second downward-facing recess in the fourth vertical wall;
wherein:
the first downward-facing recess is configured to mate with the first upward-facing projection when the second frame is stacked on top of the first frame; and
the second downward-facing recess is configured to mate with the second upward-facing projection when the second frame is stacked on top of the first frame.

10. The assembly of claim 4, wherein the first end of the sheet of flexible material is attached to the first frame and the second end of the sheet of flexible material is attached to the second frame.

11. The assembly of claim 1, wherein the first end may be detached from the at least a first location and attached to a third location on the at least a frame.

12. The assembly of claim 11, wherein the second end may be detached from the at least a second location and attached to a fourth location on the at least a frame.

13. The assembly of claim 1, wherein first location is a multi-functional support dowel of the at least a multifunctional support dowel.

14. The assembly of claim 13, wherein:
the at least a shelf includes a distal end projecting away from the first vertical wall and the at second vertical wall;
the at least a shelf contains a slot near the distal end; and
the second end of the sheet of flexible material is attached to the slot.

15. The assembly of claim 1, wherein:
the at least a shelf includes a distal end projecting away from the first vertical wall and the at second vertical wall;
the shelf contains a slot near the distal end.

16. The assembly of claim 15, wherein the second end of the sheet of flexible material is attached to a multi-functional support dowel of the at least the multi-functional support dowel.

17. The assembly of claim 1, wherein the sheet of flexible material further comprises a middle portion stretched around one or more multifunctional support dowels of the at least a multifunctional support dowel.

18. The assembly of claim 1, wherein the sheet of flexible material forms a ramp.

19. The assembly of claim 1, wherein the sheet of flexible material forms a vertical section disposed between the first vertical wall and the second vertical wall and perpendicular to the first vertical wall and the second vertical wall.

20. The assembly of claim 1, wherein the sheet of flexible material further comprises a through-hole.

\* \* \* \* \*